Figure 1:
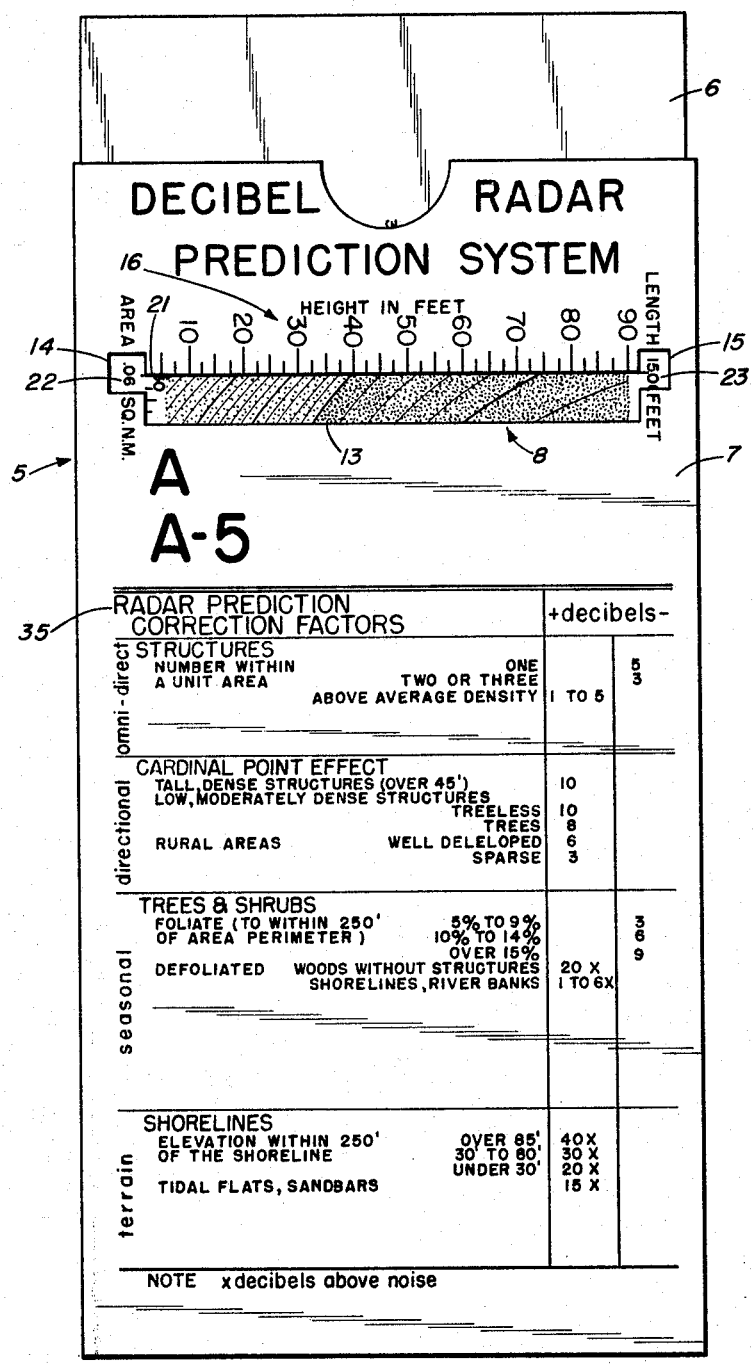

Sept. 20, 1966        J. J. EVANS        3,273,795

CALCULATOR FOR THE DECIBEL RADAR PREDICTION SYSTEM

Filed Jan. 27, 1959        4 Sheets-Sheet 1

INVENTOR
JOHN J. EVANS

BY R. J. Tompkins

ATTORNEY

Sept. 20, 1966 J. J. EVANS 3,273,795
CALCULATOR FOR THE DECIBEL RADAR PREDICTION SYSTEM
Filed Jan. 27, 1959 4 Sheets-Sheet 3

INVENTOR
JOHN J. EVANS
BY R. S. Tompkins
ATTORNEY

Sept. 20, 1966  J. J. EVANS  3,273,795
CALCULATOR FOR THE DECIBEL RADAR PREDICTION SYSTEM
Filed Jan. 27, 1959  4 Sheets-Sheet 4

INVENTOR
JOHN J. EVANS

BY R. J. Tompkins
ATTORNEY

United States Patent Office 3,273,795
Patented Sept. 20, 1966

3,273,795
CALCULATOR FOR THE DECIBEL RADAR PREDICTION SYSTEM
John J. Evans, Riverdale, Md., assignor to the United States of America as represented by the Secretary of the Navy
Filed Jan. 27, 1959, Ser. No. 789,458
4 Claims. (Cl. 235—89)

The invention described herein may be manufactured and used by or for the Government of the United States of America for governmental purposes without the payment of any royalties thereon or therefor.

The present invention relates to a calculator for the Decibel Radar Prediction System and more particularly to the calculator for use in the Decibel Radar Prediction System which compiles all the necessary data in an easily usable manner.

The Decibel Radar Prediction System is used in conjunction with area radar prediction analysis which is a compilation of the surface structure compositions, heights and areas in square nautical miles of the structures in any area under consideration. The area radar prediction analysis also lists critical factors of the area which effect radar return such as number of structures, tree coverage and type of terrain.

Prior methods of using the Decibel Radar Prediction System in omni-directional predictions required the steps of noting the surface structure composition, height and area of a structure under consideration, selecting a graph which includes these three variables from a manual and graphically determining the decimal return value. Separate tables and charts had to be referred to in order to correct the decibel return because of the critical area factors which effect radar return. In making a single heading prediction the same general procedure was followed except that it was necessary to measure the chord length of the structure perpendicular to the proposed line of flight and to use this variable in place of the area. In general the area radar prediction analysis materials required considerable work space, and since the pertinent graphs and tables were interspersed with procedural instruction throughout a manual, the use of the manual was unwieldly and highly conducive to error.

By means of the instant invention all of the pertinent graphs and tables are compiled on a single calculator which may be used to speedily and accurately make decibel radar predictions. Further, all of the necessary material used in making corrections in the decibel return value are incorporated on the calculator thereby providing a versatile instrument which simplifies the process of making predictions.

Accordingly, it is an object of this invention to provide a calculator which may be used in making decibel radar predictions.

More specifically, it is an object of this invention to provide a calculator which compiles all of the necessary data required to make quick and accurate decibel radar predictions.

Figure 2:
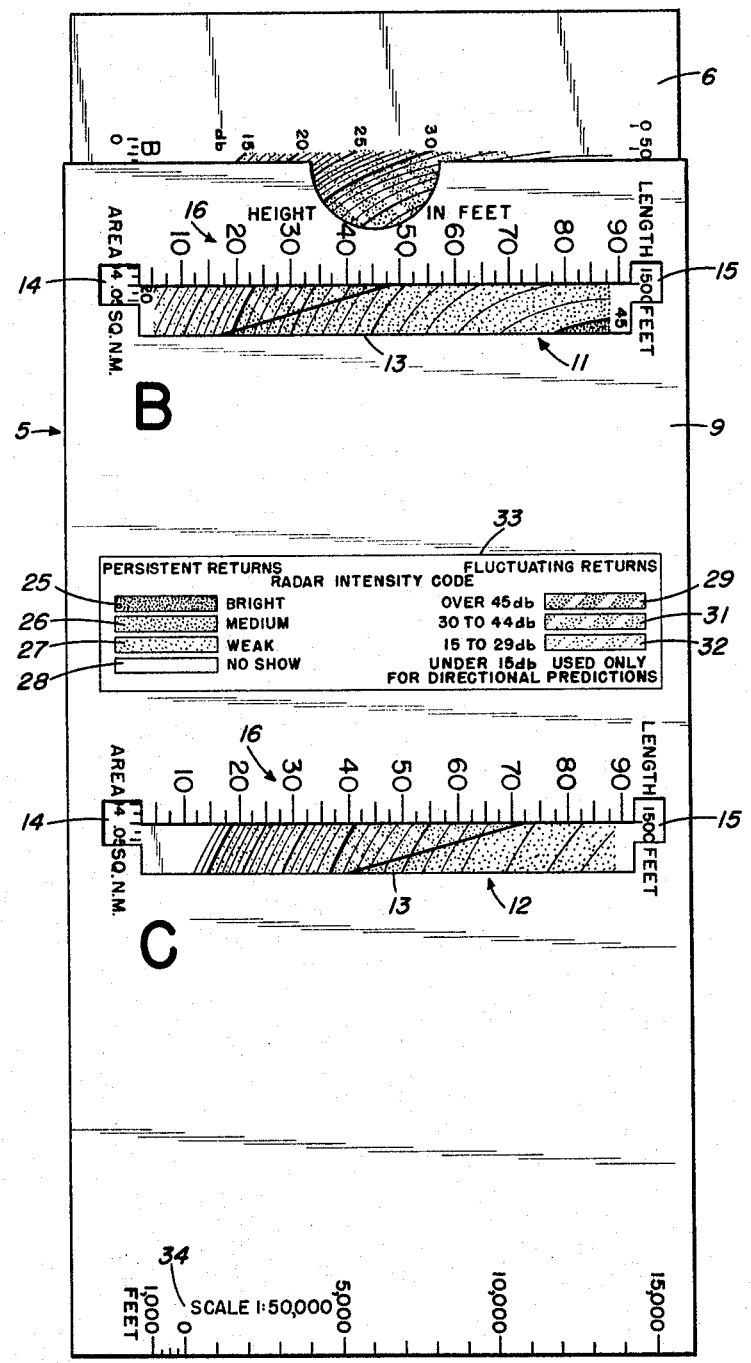
Figure 3:
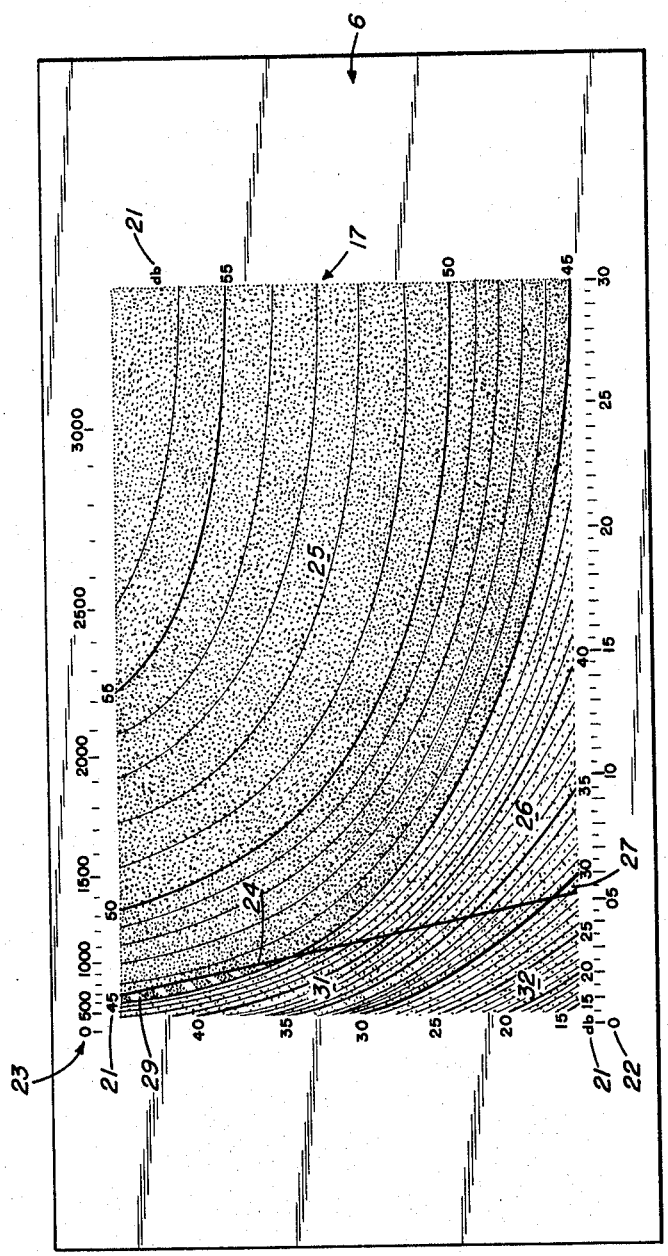
Figure 4:
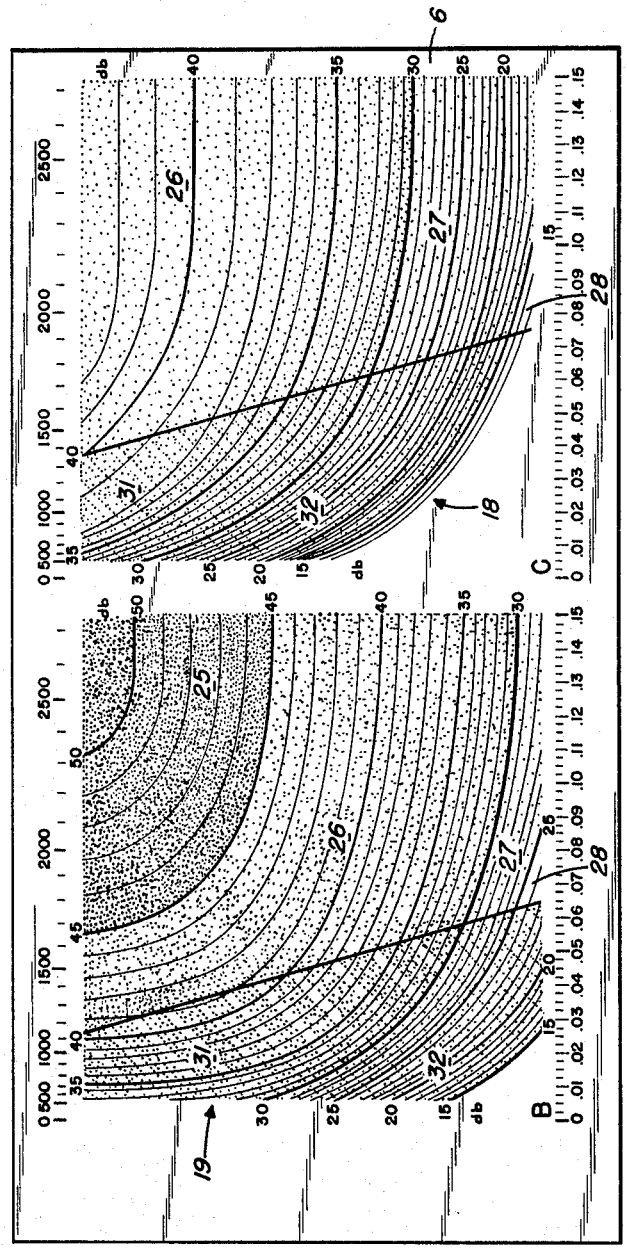

Other objects and many of the attendant advantages of this invention will be readily appreciated as the same becomes better understood by reference to the following detailed description when considered in connection with the accompanying drawings wherein:

FIG. 1 is a view showing one side of the calculator.
FIG. 2 is a view showing the opposite side of the calculator.
FIG. 3 is a side view of the calculator slide.
FIG. 4 is a side view of the opposite side of the calculator slide.

Referring to the drawings, there is shown a stiff envelope 5 having two open ends and a slide 6 disposed to be longitudinally movable therethrough. The front face 7 of the envelope contains a window 8 while the back face 9 has two windows 11 and 12, each of the windows being identical in shape and composed of a rectangular body portion 13 and offset but communicating apertures 14 and 15 at either end. These windows represent different surface material categories, A, A–5, B and C, and are so marked. A height scale 16, representing the height of a particular structure under consideration, is inscribed along the top edge of each window.

The slide 6 has a graph 17 on its front face (FIG. 3) placed to be visible through window 8 when the slide is disposed in the envelope, and graphs 18 and 19 on its back face (FIG. 4) disposed to be visible through windows 11 and 12, respectively. All of the graphs and accompanying indicia are identical in form and, therefore, only graph 17 will be described in detail. Graph 17 is composed of a plurality of curved lines representing the intensity of radar return in decibels, there being decibel indicia 21 located along the sides, top and bottom of the graph so as to be visible through the window 8. Also disposed along the sides of the graph are indicia 22 and 23 indicating area in square nautical miles and chord length in feet, respectively. The indicia 22 appear through aperture 14 and are located so that the top edge of the window serves as a horizontal grid line, the indicia 23 being similarly located and appearing through aperture 15. A slanting vertical line 24 is located at one end of the graph so that all decibel returns at the left of the line (as viewed in FIG. 3) will be fluxuating in character and those at the right persistent in character. The portion of the graph to the right of line 24, that is, the persistent return segment of the graphs, is shaded into four distinctive patterns 25, 26, 27, and 28. Each pattern represents a particular intensity of the persistent return, namely, whether the return will be bright, medium, weak or no show, respectively. Similarly, the fluxuating return segment of the graph is shaded into distinctive patterns 29, 31, and 32, each pattern representing the range in decibels of a particular fluxuating return. A code key 33 for translating the distinctive patterns, as described above, is located on the envelope between windows 11 and 12 (FIG. 2).

When the calculator is used to make an omni-directional prediction, the area in square nautical miles of the structure is set adjacent the top edge of the window representing the surface structure. It is assumed that the area is .06 square nautical miles and that the surface structure falls in category A. The slide 6 is then moved until .06 on scale 22 is adjacent the top edge of window 8 (FIG. 1). Assuming that the height of the structure is 65 feet, the decibel return value can be read on scale 21 opposite the indicia for 65 feet on scale 16, and as shown in FIG. 1, is 49 decibels. The decibel value is to the right of line 24 and in the heavily shaded portion of the graph indicating that the radar return will be persistent and bright.

If a single directional prediction is to be made, the chord length of the structure must be measured by using the scale 34 on side 9 of the envelope. Assuming that the chord length is 1500 feet and that the structure again falls in category A, the slide is then moved until 1500 on scale 23 is adjacent the top edge of window 8 (FIG. 1). For this example the height of the structure is assumed to be 17½ feet. The decibel value opposite indicia 17½ on scale 16 is then indicated as 35 decibels. The indicated decibel value is to the right of line 24 signifying a persistent return and in the medium shaded portion of the graph signifying a medium intensity return.

It is to be understood that the same procedure is followed when the surface material categories are B and C and windows 11 and 12, respectively, are used. If the surface material category is A–5, window 8 is used in making the prediction and then 5 decibels are subtracted from the indicated decibel value.

It is sometimes necessary to correct the decibel return value because of critical area factors such as tree coverage, number of structures, etc. Reference should be made to the area radar prediction analysis to determine if these factors are present and then to the correction table 35, located beneath window 8 on the envelope, to find the required correction factor in decibels. Assuming that an omni-directional prediction has been made with the indicated values in FIG. 1 and that the area radar prediction analysis shows one structure in the area, the correction table 35 is then referred to where it is indicated that 5 decibels must be substracted from the predicted decibel value of 49 decibels. The predicted value is corrected by counting down 5 of the curved lines on graph 17 to the corrected decibed return of 44 decibels. Since 44 decibels is still to the right of line 24, the return will remain persistent. However, since 44 decibels is within the medium shaded portion of the graph, the corrected return intensity will be medium instead of bright.

Obviously, many modifications and variations of the present invention are possible in the light of the above teachings. It is therefore to be understood that within the scope of the appended claims the invention may be practiced otherwise than as specifically described.

What is claimed is:

1. A calculator for the Decibel Radar Prediction System comprising an elongated, open-ended envelope, at least one window in said envelope representing a surface material composition category, an offset aperture at each end of said window and communicating therewith, height indicia inscribed along the top edge of the window, a slide slidably disposed in said envelope, a graph inscribed on said slide so as to be visible through said window, said graph being comprised of a series of curved lines representing the radar return value in decibels, decibel indicia arranged around said graph so as to be visible through said window and area indicia inscribed along one side of said graph so as to be visible through one of said apertures whereby a predicted ommi-directional decibel return for a selected structure will appear opposite the height marking representing the height of the structure when the area indicia representing the area of the structure is aligned with the top edge of said window.

2. A calculator as claimed in claim 1 including chord length indicia along the side of the graph opposite said area indicia arranged to be visible through the other of said apertures, said chord length indicia representing the chord length of said structure perpendicular to a proposed line of flight, whereby the decibel return for a single heading radar prediction will appear opposite the height indicia representing the height of said structure when the chord length indicia representing the chord length of said structure is aligned with the top edge of said window.

3. A calculator as claimed in claim 2 wherein the graph is shaded into distinctive patterns indicative of the radar intensity of any decibel return value and where said graph further includes a slanting vertical line dividing the graph into persistent and fluxuating return segments.

4. A calculator as claimed in claim 3 in which there are three windows in said envelope and in which said slide has three graphs inscribed thereon so that each graph is visible through a cooperating window.

No references cited.

RICHARD B. WILKINSON, *Primary Examiner.*

F. M. STRADER, *Examiner.*

VAN KIRK, *Assistant Examiner.*